(12) United States Patent  
Bourque et al.

(10) Patent No.: US 7,051,478 B2
(45) Date of Patent: May 30, 2006

(54) MULTIFUNCTIONAL END CAP FOR A SLIDER PANEL ASSEMBLY

(75) Inventors: Jeffrey Gerard Bourque, Novi, MI (US); Paul Joseph Kolokowski, Southgate, MI (US); Michael James Lesle, Toledo, OH (US); Lawrence R. Lyke, Novi, MI (US); Thomas William Peyton, Jr., Allen Park, MI (US); Scott Saxon, Northville, MI (US); Marcus Tanksley, Farmington Hills, MI (US); Rick Mark Weinert, Novi, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 398 days.

(21) Appl. No.: 10/696,121

(22) Filed: Oct. 29, 2003

(65) Prior Publication Data

US 2004/0098918 A1    May 27, 2004

Related U.S. Application Data

(60) Provisional application No. 60/429,815, filed on Nov. 27, 2002.

(51) Int. Cl.
  *E05D 15/06* (2006.01)
(52) U.S. Cl. .......................... 49/413; 49/408
(58) Field of Classification Search .......... 49/408, 49/413; 296/190.1, 146.16; 16/87.4 R; 52/204.51, 209
See application file for complete search history.

(56) References Cited

U.S. PATENT DOCUMENTS

| 4,788,796 A | * | 12/1988 | Matthews ................ 49/404 |
| 4,934,098 A | | 6/1990 | Prouteau et al. |
| 5,522,191 A | | 6/1996 | Wenner et al. |
| 6,125,585 A | | 10/2000 | Koneval et al. |
| 6,591,552 B1 | | 7/2003 | Rasmussen |

FOREIGN PATENT DOCUMENTS

| GB | 2 106 574 A | | 4/1983 |
| GB | 2170251 A | * | 7/1986 |
| GB | 2 209 787 A | | 5/1989 |
| GB | 2 229 479 A | | 9/1990 |
| GB | 2 230 042 A | | 10/1990 |

\* cited by examiner

*Primary Examiner*—Jerry Redman
(74) *Attorney, Agent, or Firm*—MacMillan, Sobanski & Todd, LLC

(57) ABSTRACT

A sliding panel assembly is provided, including a stationary panel, a movable panel, a guide rail slidably receiving the movable panel, and an integrated end cap. The integrated end cap includes an end body, which includes an end stop, a drain, and a locator. The end stop defines an end point of the path of the movable panel. The drain diverts moisture away from the sliding panel assembly. The locator properly positions the sliding panel assembly with respect to a mounting surface during the mounting process. The mounting surface may include a notch, allowing the locator and the mounting surface to mate.

6 Claims, 1 Drawing Sheet

MULTIFUNCTIONAL END CAP FOR A SLIDER PANEL ASSEMBLY

CROSS-REFERENCE TO RELATED APPLICATION

This application claims priority to U.S. provisional application No. 60/429,815 filed on Nov. 27, 2002, which is herein incorporated by reference.

BACKGROUND

1. Field of the Invention

This invention generally relates to a sliding panel assembly. More specifically, the invention relates to an end cap in a sliding glass window assembly.

2. Related Technology

Windows and doors (hereafter just "windows") often acquire condensation on the glass surfaces, which can lead to unwanted dampness accumulating at the base of the window. Additionally, a channeled structure, such as a rail for a sliding window, can concentrate the accumulation, especially if exposed to rain, snow, condensation, or other moisture.

Automobiles, particularly pick-up trucks, often have sliding window assemblies (backlight windows) to control the automobile passengers' exposure to ambient air and to allow access to the cargo box of the pick-up truck. These window assemblies often include at least one rail, which can accumulate a great deal of moisture regardless whether it is located on the interior or the exterior of the automobile cabin. Interior and exterior rails alike are exposed to condensation moisture. Exterior rails are usually exposed to moisture from weather elements, and interior rails are occasionally exposed to such elements. Therefore, for sliding window assemblies, such as those in automotive applications, it is advantageous to provide a way to minimize moisture accumulation.

Sliding window assemblies typically include an end stop to limit the transverse motion of the movable window and prevent the movable window from disengaging from the rail. In automotive applications, sliding window assemblies typically include a movable window and a stationary window having an opening. The movable window is movable along the rail between a "closed position" and an "open position." In the closed position, the movable window covers the stationary window opening and prevents airflow through the sliding window assembly. In the open position, the movable window fails to cover at least some portion of the opening, and permits airflow through the sliding window assembly. In order to prevent the movable window from disengaging from the rail mechanism and/or to limit the portion of the opening that is exposed, it is advantageous to provide an end stop structure to the rail.

As with all manufacturing, it is advantageous to include features that improve installation, quality, and cost. Means that readily and properly position a sliding window assembly with respect to a mounting surface of the motor vehicle would therefore be advantageous.

All of the above limitations present problems in construction, manufacturing, and installation of sliding window assemblies, such as those found in the rear windows of pick-up trucks.

SUMMARY

In overcoming the disadvantages and drawbacks of the known technology, the current invention provides a sliding window assembly providing for the minimization of moisture accumulation, while at the same time limiting the extent of movement of the movable window, and increasing the ease and accuracy with which the assembly is installed. The sliding window assembly is provided with a stationary window having portions defining an opening, at least one movable window being selectively movable between a position covering the opening (the closed position) and a position uncovering the opening (the open position), at least one guide rail for slidably receiving the movable window, and at least one end cap coupled with the guide rail. The movable window is adjustable between the open position and the closed position in order to control the airflow through the opening defined by the stationary window. The sliding window assembly may also include a handle to more easily move the movable panel, and a latch mechanism to lock the movable window in a closed position.

The end cap forms an end stop that defines the end point of travel for the movable window. Also within the end cap is formed a drain that diverts moisture away from the sliding window assembly. The drain is preferably formed in the bottom of the end cap so as to allow drainage of accumulated moisture from the end cap. Also within the end cap is provided a locator that properly positions the sliding window assembly, with respect to the vehicle mounting surface, during the installation process. In another aspect, the drain and the locator are not directly connected to each other. In another aspect, the vehicle mounting surface may include a receptacle, allowing the locator and the mounting surface to mate. Once the sliding window assembly is properly aligned with the vehicle mounting surface, an adhesive layer may connect the mounting surface and the sliding window assembly.

DETAILED DESCRIPTION OF THE INVENTION

Figure 1:
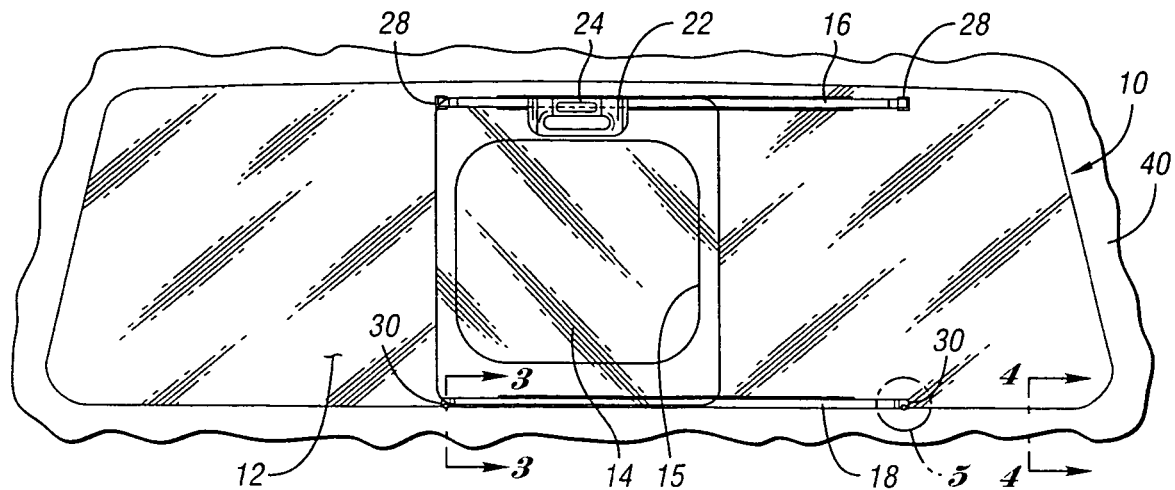
FIG. 1 is a plan view of a sliding window assembly embodying the principles of the present invention.

FIG. 1 shows a sliding window assembly 10 for a motor vehicle 40 according to an embodiment of the present invention, as viewed from the interior of the motor vehicle 40. The window assembly 10 includes, as its primary components, a stationary window 12, a movable window 14, and guide rails 16, 18 that permit translational movement of the movable window 14 with respect to the stationary window 12.

The stationary window 12 includes an opening 15 that provides access into and out of the interior cabin of the motor vehicle 40. The movable window 14 is configured to cover the opening 15 in one position, the "closed position," and to not cover the opening 15 in another position, the "open position." The movable window 14 may also be moved to partially cover the opening as desired by the motor vehicle 40 occupants. In one embodiment, the movable window 14 includes a handle 22 to aid movement of the movable window 14 and a latching mechanism 24 to lock the movable window 14 and the stationary window 12 together. The handle 22 and latching mechanism 24 are preferably constructed of a polycarbonate material (such as lexan), glass reinforced nylon or plastic.

The sliding window assembly 10 also may include an upper guide rail 16 and a lower guide rail 18, each rail 16, 18 including rail inner side walls 31 configured to permit the movable window 14 to move laterally (parallel with the guide rails 16, 18) but not transversely (perpendicular to the guide rails 16, 18). If the movable window 14 is located within a frame (not shown), the guide rails 16, 18 preferably slidably receive the frame as well. The guide rails 16, 18 are preferably composed of polypropylene, anodized aluminum, or other appropriate materials, and are mounted to the stationary window 12 by an adhesive (not shown). The adhesive may be any adhesive material commonly used for mounting to a glass surface. One such material is Scotch® permanent double-sided tape, but other appropriate materials may be used. Alternatively, the guide rails 16, 18 may also be mounted to the stationary window 12 by using other appropriate methods.

The guide rails 16, 18 respectively include upper end caps 28 and lower end caps 30. The end caps 28, 30 include a rail insert portion 32 having end cap inner side walls 33 with substantially similar dimensions as the rail inner side walls 31 to allow an uninterrupted sliding movement from the guide rails 16, 18 into the end caps 28, 30. The end caps 28, 30 are preferably connected to the guide rails 16, 18 by a press-fit or snap-fit connection where the ends of the guide rails 16, 18 form female connectors 50 that slidably receive male connectors 48. Along with the rails, the end caps 28, 30 may be mounted to the stationary window 12 by an adhesive material such as double-sided tape 35, located between the end caps 28, 30 and the stationary window 12.

Figure 2:
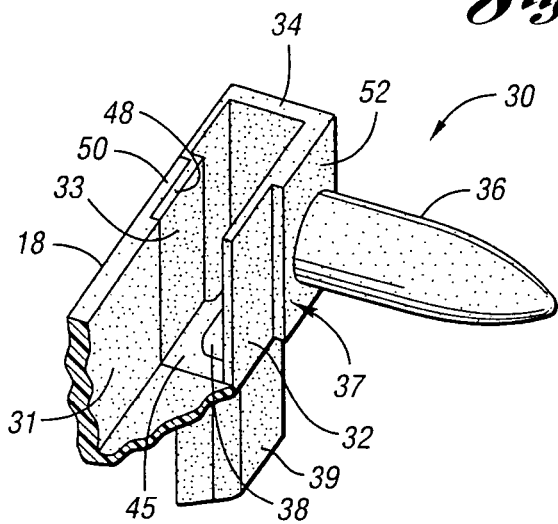
FIG. 2 is a perspective view of an end cap and a section of a guide rail used in the sliding window assembly of FIG. 1.

As shown in FIG. 2, at least one of the lower end caps 30 is constructed having an end cap body 37, formed with an end stop 34, end cap inner side walls 33, a bottom wall 45, a drain 38, and a locator 36. While many different materials may be used, the end caps 28, 30 are preferably constructed of a polycarbonate material, such as lexan, or of glass reinforced nylon or plastic.

The end stop 34 defines a wall transverse to the rail inner side walls 31 and prevents the movable window 14 from disengaging from the guide rails 16, 18 when the movable window 14 slides toward the ends of the guide rails 16, 18. The end stop 34 is configured to contact the movable window 14 and define an end point of the travel of the movable window 14. Preferably, the end stop 34 is perpendicular to the travel path of the movable window 14.

As moisture accumulates in the guide rails 16, 18 and the end cap 28, 30, the drain 38 directs moisture away from the sliding window assembly 10. In order to promote drainage, the drain 38 is preferably formed as an opening in the bottom wall 45 of the end cap body 37. As the movable window 14 slides down the guide rails 16, 18 toward the end cap 30, moisture will accumulate at the leading edge of the movable window 14 and be directed towards an end cap 30 and the drain 38. Upon reaching the drain 38, the moisture will flow down into the opening of the drain 38, being directed away from the end cap 30 by a spout 39.

Figure 3:
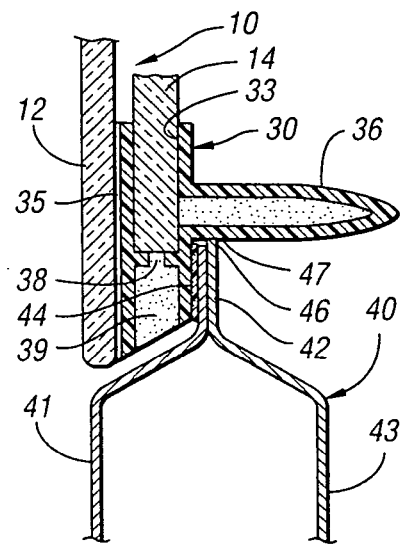
FIG. 3 is a cross-sectional view of the end cap generally taken along line 3—3 of FIG. 1.
Figure 4:
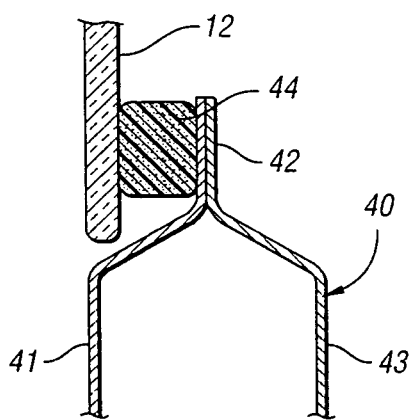
FIG. 4 is a cross-sectional view of a connection between a stationary window and a motor vehicle flange generally taken along the line 4—4 in FIG. 1.

The sliding window assembly 10 is preferably mounted to a motor vehicle 40, and more preferably a pick-up truck. To readily and properly position the sliding window assembly 10 with respect to the motor vehicle 40 during installation a locator 36 and a flange 42 are provided. As shown in FIGS. 3 and 4, the flange 42 is preferably formed by the motor vehicle exterior wall 41 and interior wall 43. The locator 36 preferably extends substantially perpendicularly from the outer side wall 52 of the end cap body 37.

Figure 5:
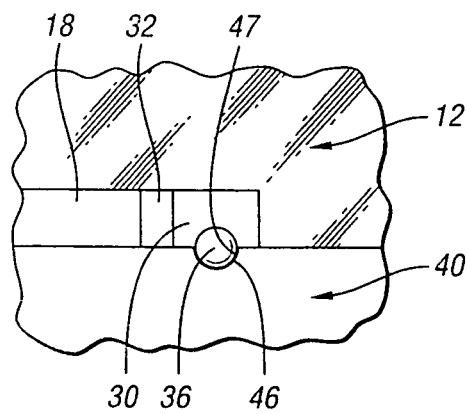
FIG. 5 is a close-up view of a connection between the end cap and the motor vehicle flange generally shown by the line 5—5 in FIG. 1.

During installation of the sliding window assembly 10 into the motor vehicle 40, the locator 36 is positioned such as to be received within a receptacle, such as a notch 46 or groove on the flange 42, as shown in FIGS. 3 and 5. The locator 36 and the notch 46 are configured so the sliding window assembly 10 is properly positioned with respect to the motor vehicle 40 for installation when the locator 36 and the notch 46 are in contact with one another. In order to facilitate contact between the locator 36 and the notch 46, the locator 36 and notch 46 preferably have surfaces that mate with each other, such as the locator 36 including a protuberance with a rounded, convex bottom surface 47, and the notch 46 being a rounded concave groove. The notch 46 can be of other appropriate shapes and sizes that mate with a correspondingly shaped locator 36, such as a square slot or a hole.

The sliding window assembly 10 is preferably attached to the motor vehicle 40 via a water-tight seal. More specifically, an adhesive layer 44 is located between the stationary window 12 and the window flange 42 of the motor vehicle 40 to form a water-tight seal. The adhesive layer 44 may be any adhesive commonly used for the mounting of windows in vehicles. One such material is 3M product PT1500, but other appropriate materials may be used. The adhesive layer 44 is preferably located on the side of the stationary window 12 that faces interiorly of the motor vehicle 40, located along the periphery of the stationary window 12, and located along the lower guide rail 18, as shown in FIGS. 1, 3, and 4. The adhesive layer 44 is also preferably located on the same face of the stationary window 12 as the guide rails 16, 18 such that the guide rails 16, 18 and the movable window 14 are oriented toward the interior of the motor vehicle 40 passenger compartment. Under this embodiment, the drain(s) 38 primarily drain away condensation formed on the inside face of the sliding window assembly 10.

In order to form a flush attachment between the motor vehicle 40 and the sliding window assembly 10, the adhesive layer 44 is preferably provided in a thicker layer along the stationary window 12 (as shown in FIG. 4) than along the guide rails 16, 18 (as shown in FIG. 3). In other words, the adhesive layer 44 in contact with the stationary window 12 in FIG. 4 has approximately the same thickness as the combination of the end cap 30 and the adhesive layer 44 in FIG. 3. For convenience, gaps may be formed in the adhesive layer 44 at locations there along and/or corresponding to lower end cap(s) 30 in order to prevent the adhesive layer 44 from overlapping onto the motor vehicle exterior 41 and blocking the drain 38. The bottom of the lower end cap(s) 30 may also be tapered to be parallel with the motor vehicle exterior wall 41 and to 44 to prevent the drain 38 from becoming obstructed by the adhesive layer 44.

The foregoing disclosure is the best mode devised by the inventors for practicing the invention. Inasmuch as the foregoing disclosure is intended to enable one skilled in the pertinent art to practice the instant invention, it should not be construed to be limited thereby but rather should be construed to include such aforementioned obvious variations and be limited only by the spirit and scope of the following claims.

The invention claimed is:

1. A sliding panel assembly comprising:
   at least one stationary panel;
   at least one guide rail coupled to the stationary panel;
   at least one movable panel slidingly received within the guide rail and configured to slidably move with respect to the stationary panel along a movable panel path;
   at least one end cap coupled with the guide rail, the end cap including:
   an end cap body having a bottom wall and opposing side walls;
   an end stop forming an end wall of the end cap body, the end stop defines an end of the movable panel path of the movable panel;
   a drain formed in the bottom wall of the end cap body, the drain permits fluid drainage from the sliding panel assembly; and
   a locator coupled with the end cap body, the locator comprising a protrusion extending transversely from said end cap body and contacts a receptacle of a motor vehicle.

2. A sliding panel assembly as in claim 1, wherein the locator is defined by a protuberance extending substantially perpendicularly from a side wall of the end cap body.

3. A sliding panel assembly as in claim 1, wherein the at least one of the stationary panel and the at least one movable panel include a glass section.

4. A sliding panel assembly as in claim 1, wherein the stationary panel is configured to be connected to the motor vehicle.

5. A sliding panel assembly as in claim 4, wherein an adhesive layer is mounted to the stationary panel and configured to connect to the motor vehicle.

6. A sliding window assembly comprising:
   at least one stationary window including portions defining an opening;
   a guide rail mounted to the stationary window, the guide rail including portions defining a channel therein;
   at least one movable window coupled with the stationary window and slidingly received within the channel of the guide rail, the at least one movable window moves between a first position covering the opening and a second position uncovering the opening, and the at least one movable window moves within the guide rail; and
   at least one end cap coupled to one end of the guide rail, the end cap including:
   an end cap body having side walls and a bottom wall;
   an end stop forming an end wall of the end cap body, the end stop defining an end of the movable panel path;
   a drain formed in the bottom wall of the end cap body, the drain permits fluid drainage from the sliding window assembly; and
   a locator coupled with the end cap body and extending transversely therefrom, the locator contacts a receptacle section of a mounting surface of a vehicle.

* * * * *